Patented June 30, 1931

1,812,734

UNITED STATES PATENT OFFICE

ELMER C. BERTOLET, OF PHILADELPHIA, PENNSYLVANIA, ASSIGNOR TO GEORGE K. HALE MANUFACTURING COMPANY, OF PHILADELPHIA, PENNSYLVANIA, A CORPORATION OF PENNSYLVANIA

METHOD OF FAST-DYEING BONE

No Drawing. Original application filed April 23, 1925, Serial No. 25,438. Divided and this application filed July 17, 1926. Serial No. 123,249.

This invention relates to an improvement in methods of fast-dyeing bone, and is a division of my application Serial No. 25,438, filed April 23, 1925, now Patent 1,594,490, August 3, 1926.

The object of the invention is to completely penetrate the bone or any bone article, such as buttons or the like with coloring matter.

This process consists in treating the bone material or any bone article with suitable coloring matter, such as oil soluble, fat soluble, or spirit soluble dyes, or any basic dyes or mixtures of the same in solutions of fats, oils, or fatty acids.

In order to carry the dye into the bone material, the coloring matter, or the coloring matter dissolved in fat, may be mixed with alcohol and, if desired, a crude petroleum distillate or coal tar distillate may be added thereto. The fat dissolves the dye or puts the same in solution, thus eliminating the small particles of free dye.

If desired, a small percentage of kerosene may be used with the alcohol in order to thoroughly penetrate the bone material with some colors. Any of the crude petroleum or coal tar distillates may be used, such as gasoline, benzol, or petroleum naphtha.

The method of dyeing is to place the bone material or articles to be dyed in any kind of a receptacle containing the prepared solution and allow it to stand or cook for a length of time and at a temperature which varies with the depth of shade desired, the best results for most colors being obtained when they are treated for approximately thirty (30) minutes at a temperature of from ordinary room temperature to 172° F., the boiling point of alcohol.

The fats, if used, are for the purpose of dissolving the coloring matter and where the crude petroleum or coal tar distillates are added, they serve to eliminate any granular parts of the dye which may be left in the bone material, leaving the color entirely clear.

The alcohol acts as a solvent and penetrant to carry the coloring matter and fat into the bone material and it will quickly evaporate, leaving the material colored entirely throughout. It is preferred to use alcohol as the solvent and penetrant because of its quick evaporating properties. The resultant product is a bone article completely penetrated through and through or to a substantial depth with coloring matter.

I claim:

1. The method of coloring bone material consisting in subjecting it to a mixture of coloring matter and alcohol in the presence of fat for causing a penetration of the coloring matter to a substantial depth.

2. The method of coloring bone material including subjecting it to a mixture of coloring matter, fat and alcohol.

3. The method of coloring bone material consisting in subjecting it to a mixture of coloring matter, a clarifier, and alcohol as a solvent and penetrant.

4. The method of coloring bone material in its natural state comprising subjecting it to a mixture of coloring matter, fat as a color clarifier, and alcohol as a solvent and penetrant.

5. The method of coloring bone material comprising subjecting it to a mixture of coloring matter and alcohol in the presence of fat.

In testimony whereof I affix my signature.

ELMER C. BERTOLET.